United States Patent [19]

Hong

[11] Patent Number: 5,621,268

[45] Date of Patent: Apr. 15, 1997

[54] ELECTROMAGNETIC WAVE SHIELDING DEVICE FOR DEFLECTION YOKE

[75] Inventor: Sung-pyo Hong, Suwon, Rep. of Korea

[73] Assignee: Samsung Electronics Co., Ltd., Kyungki-do, Rep. of Korea

[21] Appl. No.: 442,400

[22] Filed: May 16, 1995

[30] Foreign Application Priority Data

Jun. 30, 1994 [KR] Rep. of Korea ............... 94-15700

[51] Int. Cl.⁶ .................................. H01J 1/52
[52] U.S. Cl. ............................ 313/313; 313/479
[58] Field of Search ................... 313/479, 313, 313/430, 431, 433, 440, 412; 335/212, 214, 296, 307, 304, 306

[56] References Cited

U.S. PATENT DOCUMENTS 3,808,570  4/1974  Thompson et al. ............ 313/417
5,227,752  7/1993  Ham ................................ 335/210
5,469,617  11/1995 Perreaut et al. ................. 335/210
5,475,282  12/1995 Liao ................................ 313/440

Primary Examiner—Sandra L. O'Shea
Assistant Examiner—Vip Patel
Attorney, Agent, or Firm—Sughrue, Mion, Zinn, Macpeak & Seas

[57] ABSTRACT

A shielding device for blocking electromagnetic waves emitted from a deflection yoke which has a predetermined magnetic permeability and includes at least one shielding plate coaxially disposed on in the neck of the deflection yoke, to thereby simplify assembly and enhance productivity.

44 Claims, 5 Drawing Sheets

ELECTROMAGNETIC WAVE SHIELDING DEVICE FOR DEFLECTION YOKE

BACKGROUND OF THE INVENTION

The present invention relates to an electromagnetic wave shielding device for a deflection yoke, and more particularly, to an electromagnetic wave shielding device for shielding leakage of an electromagnetic wave generated by a deflection yoke provided in the neck of a cathode ray tube.

A deflection yoke is comprised of a pair of a funnel-shaped separators, a horizontal deflection coil located inside the separator and a vertical deflection coil wound onto a ferrite core and which is located outside of the separator. The deflection yoke disposed on a neck of a cathode ray tube. When an electrical potential is applied to the deflection yoke, an electromagnetic field is generated. The field deflects the beams emitted from an electron gun, to thereby determine the scanning position on a screen.

However, in such a deflection yoke as described above, electromagnetic waves leak outward from the electron gun. Such leakage is unnecessary for proper electron beam deflection and may be harmful to humans. Therefore, in order to keep leakage levels low in products having a cathode ray tube, it is required that leakage electromagnetic waves may not exceed a predetermined level. For example, an MPR2-size CRT has an ELMF rating which must be below 240 nT at a distance of 0.5 m.

FIG. 1 is a schematic side view of a conventional deflection yoke, and FIG. 2 is a section view of the conventional deflection yoke of FIG. 1, taken along sectional line A—A thereof.

A deflection yoke 2 is comprised of a funnel-shaped separator 10 having a flange 20, a horizontal deflection coil 40 attached to the inner circumferential surface of the separator 10, and a vertical deflection coil 50 wound onto a ferrite core 30 and attached to the outer circumferential surface of separator 10. In addition, wave cancelling coils 60 and 60a for shielding radiated electromagnetic waves generated from horizontal deflection coil 40 are attached to flange 20. Wave cancelling coils 60 and 60a are electrically connected to vertical deflection coil 50.

In the operation of such a conventional electromagnetic wave shielding device, when the cathode ray tube is operated and power is applied to the horizontal and vertical deflection coils, an electron beam is emitted from an electron gun within the neck of the cathode ray tube. The emitted electron beam is deflected at a predetermined angle by an electromagnetic deflection force generated by the coils, in order for the electron beam to land on a specific point of a fluorescent screen.

As shown in FIG. 3, an electromagnetic field 41 leaks from horizontal deflection coil 40. Meanwhile, an inverse electromagnetic field 61 is generated from wave cancelling coils 60 and 60a attached to flange 20 of the deflection yoke. Accordingly, the leaked electromagnetic field 41 is cancelled by inverse electromagnetic field 61.

However, the conventional electromagnetic shielding device has certain drawbacks. First, wave cancelling coils 60 and 60a are soldered onto the separator 10, thereby complicating the assembly process. Second, the exact path of the inverse electromagnetic field varies depending on the mounting angle of the attached coils 60 and 60a, so that the degree of attenuation (cancellation), of the radiated electromagnetic wave differs for each cathode ray tube manufactured, thereby degrading product reliability.

SUMMARY OF THE INVENTION

Accordingly, it is an object of the present invention to provide a shielding device for shielding electromagnetic waves "leaked" by the deflection yoke of a cathode ray tube, which can be easily installed.

It is another object of the present invention to provide an electromagnetic wave shielding device having a high degree of efficiency for attenuating a "leaked" electromagnetic wave.

To accomplish the above objects, there is provided an electromagnetic wave shielding device for blocking an electromagnetic wave leaked from a deflection yoke disposed on the neck of a cathode ray tube, the shielding device comprising an annular shielding plate having a predetermined magnetic permeability and which is disposed coaxially with the deflection yoke.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

A shielding device of the present invention has generally the same structure as the conventional deflection yoke described above. Accordingly, a detailed explanation thereof will be omitted.

Figure 1:
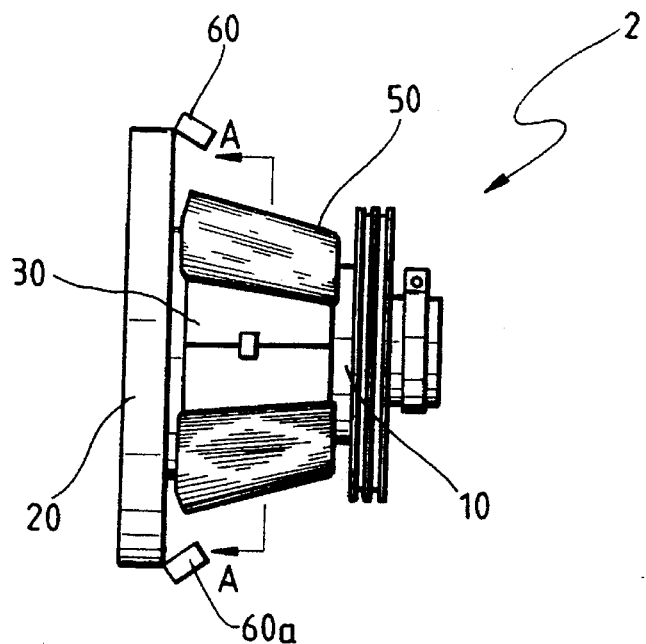
FIG. 1 is a side view of a deflection yoke where a conventional electromagnetic wave shielding device is installed.
Figure 2:
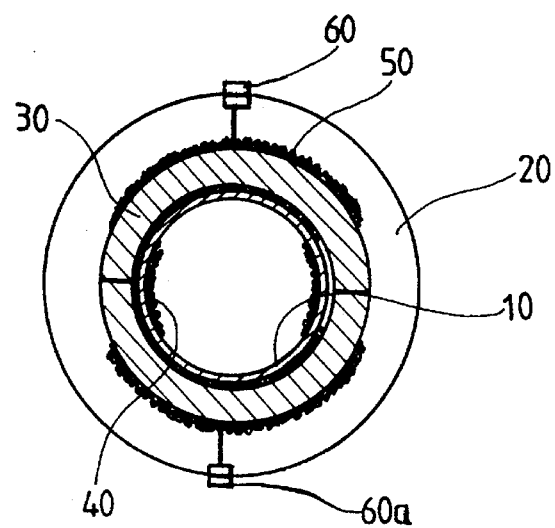
FIG. 2 is a sectional view of the deflection yoke of FIG. 1, taken along line A—A.
Figure 3:
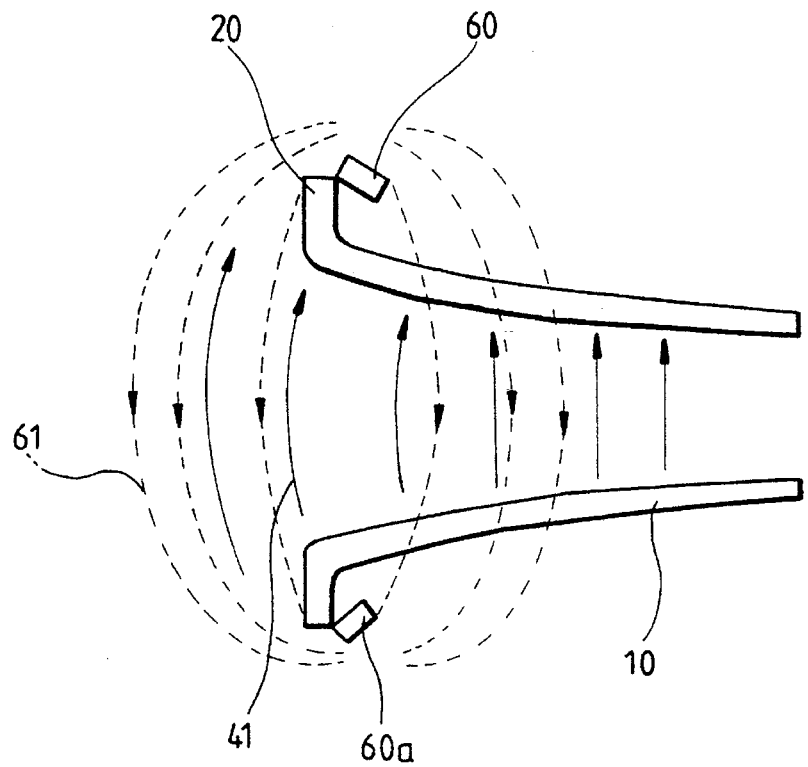
FIG. 3 is a schematic view of a conventional cathode ray tube.
Figure 4:
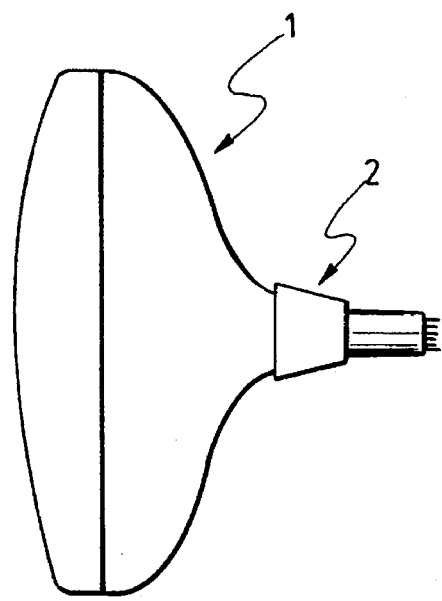
FIG. 4 is a schematic side view of a general cathode ray tube.
Figure 5:
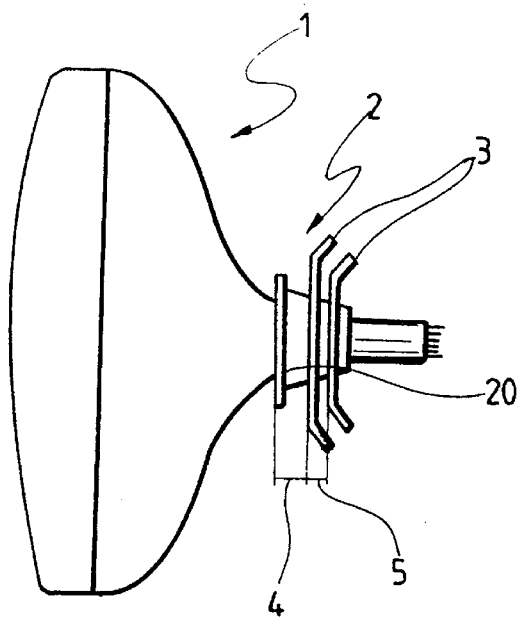
FIG. 5 is a side view of a cathode ray tube where an electromagnetic wave shielding device of a deflection yoke according to the present invention is provided.
Figure 6:
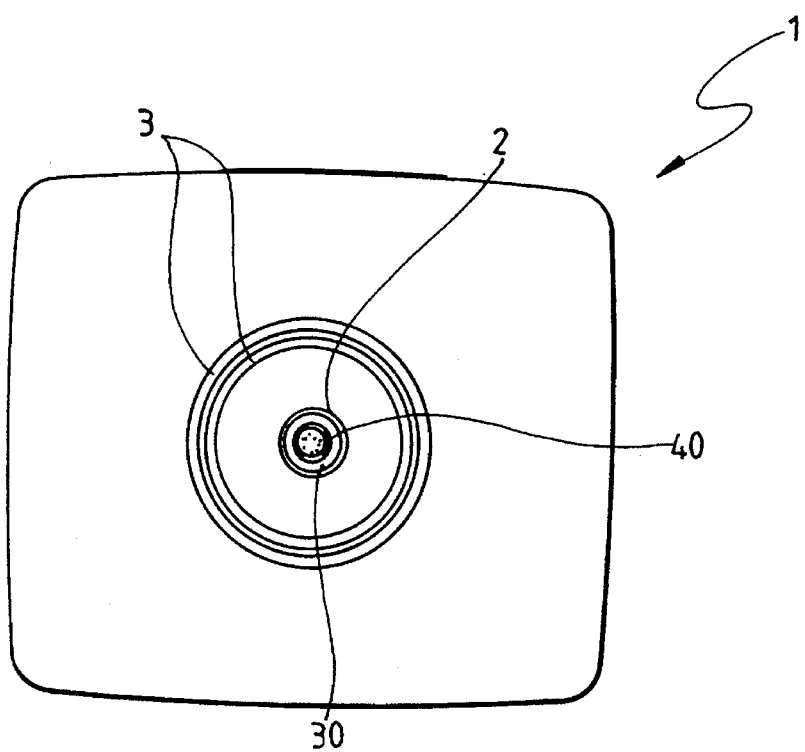
FIG. 6 is a side view of the cathode ray tube shown in FIG. 5.
Figure 7:
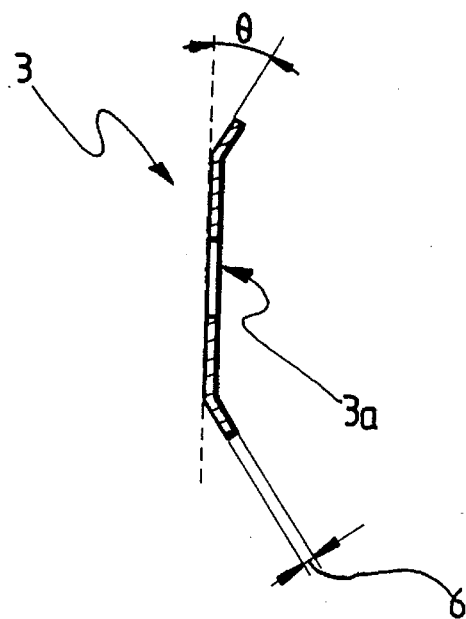
FIG. 7 is a sectional view showing a shielding plate employed in the cathode ray tube shown in FIG. 5.
Figure 8:
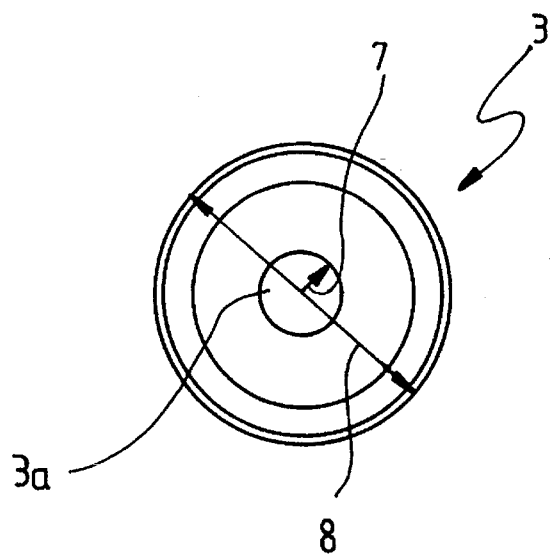
FIG. 8 is a front view of the shielding plate shown in FIG. 7.
Figure 9:
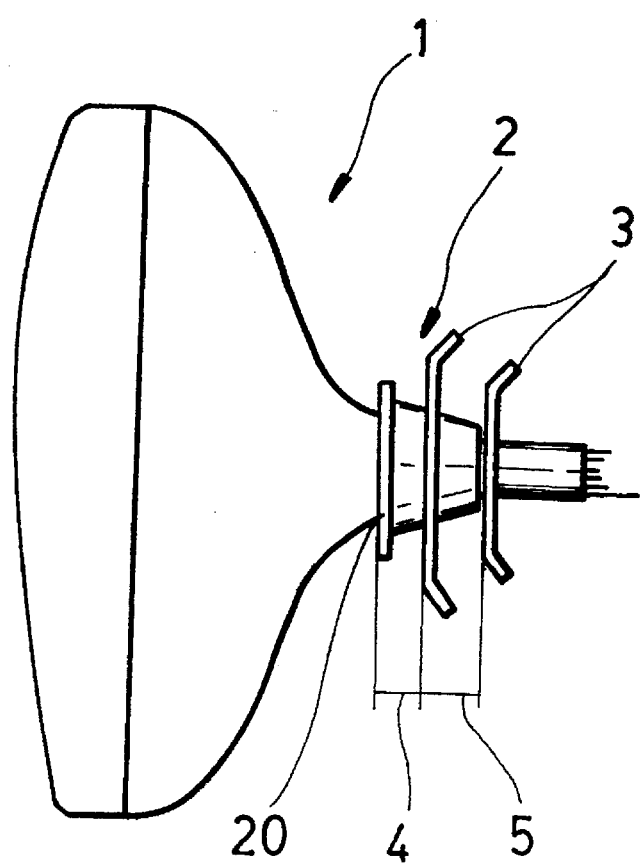
FIG. 9 is a side view of a cathode ray tube where electromagnetic wave shielding devices are disposed on a deflection yoke and a neck of the cathode ray tube.

Referring to FIG. 5 and FIG. 6, deflection yoke 2 for deflecting an electron beam emitted from an electron gun is coupled to the neck of cathode ray tube 1. A shielding plate 3 for shielding electromagnetic waves generated from deflection yoke 2 is coupled to deflection yoke 2 coaxially with the X axis of the cathode ray tube. Shielding plate 3 has an annular shape and may also be directly attached to the neck of cathode ray tube 1 as shown in FIG. 9. That is to say, as shown in FIG. 7 and FIG. 8, a through hole 3a is formed in the center of shielding plate 3, which can be coupled to deflection yoke 2 or the neck of cathode ray tube 1. As shown in FIG. 5, a plurality of shielding plates 3 can be installed in deflection yoke 2 or on the neck of cathode ray tube 1 at a predetermined spacing.

Referring to FIG. 5, when shielding plates 3 are installed, a distance 4 from flange 20 of deflection yoke 2 to a first shielding plate 3 and a spacing 5 between the adjacent second shielding plate 3 are both less than 15 cm.

Referring to FIG. 5 and FIG. 7, an edge of shielding plate 3 is bent with respect to the axis of deflection yoke 2. Here, the bending angle (θ) is less than 80 degrees. In addition, the direction of the bend is opposite to the direction of travel of the emitted electron beam.

Referring to FIG. 7 and FIG. 8, the radius 7 of through hole 3a of shielding plate 3 is greater than 2 cm, and the outer diameter 8 of shielding plate 3 is less than 20 cm. In addition, the thickness 6 of shielding plate 3 is less than 2 cm.

Further, the initial, direct current magnetic permeability of the material constituting shielding plate 3 is greater than 100. Ferrous oxides (for example, FeO, $Fe_2O_3$ or $Fe_3O_4$), a ferroalloy having a silicon component of 0.01 to 10%, a ferroalloy having an aluminum component of 0.01 to 20%, an alloy having a 20% nickel component, or an irregular metal grid of ferrite or nickel can be used as the material for shielding plate 3.

The electromagnetic wave shielding device according to an embodiment of the present invention operates as follows.

When an electrical potential is applied to deflection yoke 2 of cathode ray tube 1, an electromagnetic wave is generated from the vertical and horizontal deflection coils of deflection yoke 2. Here, shielding plate 3 blocks the leakage of the radiating electromagnetic wave.

In order to operate as such, shielding plate 3 requires a magnetic permeability exceeding a predetermined value. Magnetic permeability ($\mu_{IDC}$) can be expressed as follows.

$$\mu_{IDC} = 1/\mu_O \text{Lim}_{n \to O}(B/H) \quad (1)$$

Here, $\mu_{IDC}$ the is initial DC magnetic permeability, $\mu_O$ is the magnetic permeability in a vacuum (i.e., $\mu_O = 4\pi \times 10^{-7}$), B is the DC flux density, and H is the DC magnetic strength.

In the above expression, the magnetic permeability of a material used for shielding an electromagnetic wave equals the ratio of the material's flux density to magnetic strength, and is determined based on the medium (e.g. air) occupying the space where the magnetic field exists. In other words, magnetic permeability is the flux density capacitance which can be absorbed by a specific material per unit of the magnetic field. Therefore, it is advantageous for shielding plate 3 to have a large magnetic permeability.

The electromagnetic shielding effect varies depending on distance 4 from the flange end of deflection yoke 2 to shielding plate 3 and spacing 5 between the adjacent shielding plates 3.

As shown in the above expression, since shielding plate 3 blocks the electromagnetic wave existing around the area, the shielding effect becomes greater when distance 4 and space 5 are made shorter.

However, a screen characteristic of the cathode ray tube may change when shielding plate 3 is placed too close to flange 20 of deflection yoke 2. Therefore, distance 4 from the end of deflection yoke 2 to shielding plate 3 should be suitably controlled.

Referring to FIG. 7 and FIG. 8, as shielding plate 3 is made thicker, radius 7 of lead-though hole 3a made smaller and outer diameter 8 made larger, the shielding effect becomes greater. However, when shielding plate 3 is too thick, a screen characteristic of a cathode ray tube may change. Therefore, the thickness of shielding plate 3 should be suitably controlled.

In addition, bending angle (θ) of shielding plate 3 should be suitably controlled according to the internal and external structure of the cathode ray tube and the structure of a deflection yoke.

When two or more shielding plates 3 are installed, the shielding effect is increased over the case where only single shielding plate 3 is installed.

A ferrite material having magnetic permeability substantially equal to 3200 is employed as the material for shielding plate 3 for changing the shielding effect. Where a deflection yoke provided with a single shielding plate 3 having a bending angle θ of the shielding plate of 0 degrees, thickness 6 of 5 mm, outer diameter 8 of 8.75 cm, radius 7 of through hole 3a of 7.5 cm and distance 4 from the end of the deflection yoke to shielding plate 3 of 5 cm, is applied to a 14-inch industrial cathode ray tube, more than 50% of the ELMF leakage electromagnetic waves is blocked. When distance 4 from the end of the deflection yoke to shielding plate 3 is controlled to 0 cm, and the other conditions are maintained the same as set forth above, 80% of the leakage electromagnetic wave is eliminated.

The shielding device of the present invention has certain distinct advantages, as follows. First, in contrast to the conventional shielding device which requires a process for winding the wave cancelling coil, the simple shielding plate 3 having a predetermined magnetic permeability is employed in the shielding device of the present invention. Therefore, the device of the present invention does not require a process for winding a coil, which thereby simplifies manufacturing. In addition, conventional wave cancelling coil requires attachment by soldering, whereas the shielding plate is assembled simply by means of a mechanical coupling, simplifying the assembly process.

Second, the wave cancelling coil employed in a conventional shielding device is installed at the end of the deflection yoke and thus, adversely affects screen display quality. In contrast, shielding plate 3 employed in the present invention is placed at an intermediate portion of the deflection yoke, to thereby decrease the adverse effects on screen display quality.

Third, the shielding device employed by the present invention is efficient in cancelling leakage electromagnetic waves.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An electromagnetic wave shielding device for blocking an electromagnetic wave leaked from a deflection yoke provided on a neck of a cathode ray tube, said shielding device comprising:

a shielding plate having a predetermined magnetic permeability and which is disposed coaxially with said deflection yoke, wherein the magnetic properties of said shielding plate are substantially the same throughout said shielding plate.

2. An electromagnetic wave shielding device according to claim 1, wherein said shielding plate is installed on an outer circumferential surface of said deflection yoke.

3. An electromagnetic wave shielding device according to claim 2, wherein said shielding plate has an annular shape having a through hole in the center thereof.

4. An electromagnetic wave shielding device according to claim 2, wherein said shielding device is further comprised of another shielding plate spaced apart from said shielding plate by a predetermined spacing.

5. An electromagnetic wave shielding device according to claim 1, wherein said shielding plate is disposed on the neck of the cathode ray tube.

6. An electromagnetic wave shielding device according to claim 5, wherein said shielding plate has an annular shape having a through hole in the center thereof.

7. An electromagnetic wave shielding device according to claim 5, wherein said shielding device is further comprised of another shielding plate spaced apart from said shielding plate by a predetermined spacing.

8. An electromagnetic wave shielding device according to claim 1, wherein said shielding plate is made of a ferrous oxide.

9. An electromagnetic wave shielding device according to claim 8, wherein said shielding plate has an annular shape having a through hole in the center thereof.

10. An electromagnetic wave shielding device according to claim 8, wherein said shielding device is further comprised of another shielding plate spaced apart from said shielding plate by a predetermined spacing.

11. An electromagnetic wave shielding device according to claim 1, wherein said shielding plate is made of a ferroalloy having a silicon component.

12. An electromagnetic wave shielding device according to claim 11, wherein said shielding plate has an annular shape having a through hole in the center thereof.

13. An electromagnetic wave shielding device according to claim 11, wherein said shielding device is further comprised of another shielding plate spaced apart from said shielding plate by a predetermined spacing.

14. An electromagnetic wave shielding device according to claim 1, wherein said shielding plate is made of a ferroalloy having an aluminum component.

15. An electromagnetic wave shielding device according to claim 14, wherein said shielding plate has an annular shape having a through hole in the center thereof.

16. An electromagnetic wave shielding device according to claim 14, wherein said shielding device is further comprised of another shielding plate spaced apart from said shielding plate by a predetermined spacing.

17. An electromagnetic wave shielding device according to claim 1, wherein said shielding plate is made of an alloy having a nickel component.

18. An electromagnetic wave shielding device according to claim 17, wherein said shielding plate has an annular shape having a through hole in the center thereof.

19. An electromagnetic wave shielding device according to claim 17, wherein said shielding device is further comprised of another shielding plate spaced apart from said shielding plate by a predetermined spacing.

20. An electromagnetic wave shielding device according to claim 1, wherein said shielding plate is made of an irregular metal grid made of one of ferrite and nickel.

21. An electromagnetic wave shielding device according to claim 20, wherein said shielding plate has an annular shape having a through hole in the center thereof.

22. An electromagnetic wave shielding device according to claim 21, wherein the diameter of the through hole is greater than 4 cm, an outer diameter of the shielding place is less than 20 cm, and a thickness of the shielding plate is less than 2 cm.

23. An electromagnetic wave shielding device according to claim 22, wherein the diameter of the through hole is substantially equal to 7.5 cm, the outer diameter of the shielding plate is substantially equal to 8.75 cm, the predetermined angle is 0 degrees, the thickness of the shielding plate is substantially equal to 5 mm, and a distance to an end of the deflection yoke is less than 5 cm, and the predetermined magnetic permeability is substantially equal to 3200.

24. An electromagnetic wave shielding device according to claim 20, wherein said shielding device is further comprised of another shielding plate spaced apart from said shielding plate by a predetermined spacing.

25. An electromagnetic wave shielding device according to claim 24, wherein the predetermined spacing is less than 15 cm.

26. An electromagnetic wave shielding device according to claim 1, wherein the periphery of said shielding plate is bent at a predetermined angle with respect to the axis of said deflection yoke.

27. An electromagnetic wave shielding device according to claim 26, wherein the periphery of said shielding plate is bent in an opposite direction from a direction of emanation of an electron beam within the cathode ray tube.

28. An electromagnetic wave shielding device according to claim 26, wherein said shielding plate has an annular shape having a through hole in the center thereof.

29. An electromagnetic wave shielding device according to claim 26, wherein said shielding device is further comprised of another shielding plate spaced apart from said shielding plate by a predetermined spacing.

30. An electromagnetic wave shielding device according to claim 26, wherein the predetermined angle is less than 80 degrees.

31. An electromagnetic wave shielding device according to claim 1, wherein said shielding plate has an annular shape having a through hole in the center thereof.

32. An electromagnetic wave shielding device according to claim 1, wherein said shielding device is further comprised of another shielding plate spaced apart from said shielding plate by a predetermined spacing.

33. An electromagnetic wave shielding device according to claim 1, wherein the predetermined magnetic permeability is much greater than the magnetic permeability of a vacuum.

34. An electromagnetic wave shielding device according to claim 33, wherein the predetermined magnetic permeability is greater than 100.

35. An electromagnetic wave shielding device according to claim 1, wherein said shielding plate has a magnetic permeability greater than 100.

36. An electromagnetic wave shielding device according to claim 1, wherein said shielding plate has a magnetic permeability substantially equal to 3200.

37. An electromagnetic wave shielding device according to claim 1, wherein said shielding plate has an edge surrounding said shielding plate said edge being bent at a predetermined angle.

38. An electromagnetic wave shielding device for attenuating an electromagnetic wave emanating from a deflection yoke disposed on a neck of a cathode ray tube, said shielding device comprising:

a plurality of shielding plates each having a predetermined magnetic permeability and coaxially disposed on the deflection yoke, wherein the magnetic properties of each of said plurality of shielding plates is substantially the same throughout said each of said plurality of shielding plates.

39. An electromagnetic wave shielding device according to claim 38, wherein adjacent ones of said plurality of shielding plates are spaced apart from one another.

40. An electromagnetic wave shielding device according to claim 39, wherein the space between said shielding plate is less than 15 cm.

41. An electromagnetic wave shielding device according to claim 38, wherein the deflection yoke has a flange and one of the plurality of shielding plates adjacent to said flange is spaced from said flange by less than 15 cm.

42. An electromagnetic wave shielding device according to claim 38, wherein said shielding plate has a magnetic permeability greater than 100.

43. An electromagnetic wave shielding device according to claim 38, wherein said shielding plate has a magnetic permeability substantially equal to 3200.

44. An electromagnetic wave shielding device according to claim 38, wherein each of said plurality of shielding plates has an edge surrounding said shielding plate said edge being bent at a predetermined angle.

* * * * *